(12) United States Patent
Morishita et al.

(10) Patent No.: US 10,937,066 B2
(45) Date of Patent: Mar. 2, 2021

(54) TERMINAL DEVICE, PROGRAM, AND METHOD

(71) Applicant: GungHo Online Entertainment, Inc., Tokyo (JP)

(72) Inventors: Kazuki Morishita, Tokyo (JP); Ken Narita, Tokyo (JP)

(73) Assignee: GungHo Online Entertainment, Inc.

(*) Notice: Subject to any disclaimer, the term of this patent is extended or adjusted under 35 U.S.C. 154(b) by 356 days.

(21) Appl. No.: 15/841,558

(22) Filed: Dec. 14, 2017

(65) Prior Publication Data

US 2019/0066165 A1 Feb. 28, 2019

Related U.S. Application Data

(63) Continuation of application No. PCT/JP2017/030305, filed on Aug. 24, 2017.

(51) Int. Cl.
*G06Q 30/02* (2012.01)
*G06F 16/9535* (2019.01)
(Continued)

(52) U.S. Cl.
CPC ..... *G06Q 30/0276* (2013.01); *G06F 16/5866* (2019.01); *G06F 16/9535* (2019.01); *G06Q 30/0267* (2013.01); *H04W 88/02* (2013.01)

(58) Field of Classification Search
CPC . G06Q 30/0207–0277; G06Q 30/0276; G06Q 30/0267; G06F 16/5866; G06F 16/9535; H04W 88/02
See application file for complete search history.

(56) References Cited

U.S. PATENT DOCUMENTS

| | | | | |
|---|---|---|---|---|
| 5,929,850 A | * | 7/1999 | Broadwin | H04N 21/858 348/E5.102 |
| 6,275,989 B1 | * | 8/2001 | Broadwin | H04N 7/147 348/E7.071 |

(Continued)

FOREIGN PATENT DOCUMENTS

| JP | 2002-297993 A | 10/2002 |
|---|---|---|
| JP | 2004-302231 A | 10/2004 |

(Continued)

OTHER PUBLICATIONS

Japanese Office Action for Japanese Patent Application No. 2018-134901 dated Sep. 24, 2019 with English translation (8 pages).

*Primary Examiner* — David J Stoltenberg
(74) *Attorney, Agent, or Firm* — Harness, Dickey & Pierce, P.L.C.

(57) ABSTRACT

A terminal device including: a communication interface which is communicably connected to a server device via a network; a memory that is configured to store computer readable instructions; a processor configured to execute the computer-readable instructions so as to cause the communication interface to receive image selection information of a display image from the server, the display image being included in the advertisement and select one of a plurality of images as the display image to be included in the advertisement based on the selection information, the plurality of images being stored in at least one of the memory and a storage device connected to the terminal device via the network; and a display configured to display the advertisement including the selected display image.

10 Claims, 10 Drawing Sheets

(51) Int. Cl.
*G06F 16/58* (2019.01)
*H04W 88/02* (2009.01)

(56) References Cited

U.S. PATENT DOCUMENTS

| | | | |
|---|---|---|---|
| 10,220,301 B1* | 3/2019 | Khanna | A63F 13/00 |
| 10,255,763 B2* | 4/2019 | Washington | A63F 13/352 |
| 2004/0152518 A1* | 8/2004 | Kogo | G06Q 30/02 |
| | | | 463/42 |
| 2006/0128460 A1* | 6/2006 | Muir | G07F 17/3206 |
| | | | 463/16 |
| 2007/0061203 A1* | 3/2007 | Ellis | G06Q 30/0252 |
| | | | 705/14.42 |
| 2007/0079326 A1* | 4/2007 | Datta | A63F 13/61 |
| | | | 725/34 |
| 2007/0126749 A1* | 6/2007 | Tzruya | A63F 13/63 |
| | | | 345/581 |
| 2007/0265073 A1* | 11/2007 | Novi | A63F 13/12 |
| | | | 463/35 |
| 2007/0265090 A1* | 11/2007 | Barsness | A63F 13/61 |
| | | | 463/42 |
| 2008/0004954 A1* | 1/2008 | Horvitz | G06Q 30/02 |
| | | | 705/14.49 |
| 2008/0020848 A1* | 1/2008 | Muir | G07F 17/3276 |
| | | | 463/42 |
| 2008/0301300 A1* | 12/2008 | Toub | H04L 67/06 |
| | | | 709/227 |
| 2009/0024480 A1* | 1/2009 | Dai | G06Q 30/0277 |
| | | | 705/14.5 |
| 2009/0083788 A1* | 3/2009 | Russell | H04N 21/812 |
| | | | 725/34 |
| 2009/0253506 A1* | 10/2009 | Ishii | A63F 13/48 |
| | | | 463/31 |
| 2010/0082612 A1* | 4/2010 | Duan | G06F 16/58 |
| | | | 707/724 |
| 2010/0255906 A1* | 10/2010 | Chen | A63F 13/63 |
| | | | 463/31 |
| 2011/0066492 A1* | 3/2011 | Sumiyoshi | G06Q 30/02 |
| | | | 705/14.49 |
| 2011/0107220 A1* | 5/2011 | Perlman | H04N 19/107 |
| | | | 715/720 |
| 2011/0173054 A1* | 7/2011 | Kutaragi | H04N 21/4781 |
| | | | 705/14.5 |
| 2011/0274409 A1* | 11/2011 | Zalewski | G07F 17/3255 |
| | | | 386/248 |
| 2012/0232988 A1* | 9/2012 | Yang | G06Q 30/02 |
| | | | 705/14.49 |
| 2013/0111518 A1* | 5/2013 | Kawai | G06Q 30/0241 |
| | | | 725/32 |
| 2013/0197982 A1* | 8/2013 | Watfa | G06Q 30/0241 |
| | | | 705/14.12 |
| 2013/0260877 A1* | 10/2013 | Katagai | A63F 13/63 |
| | | | 463/29 |
| 2013/0263180 A1* | 10/2013 | Yang | H04N 21/25891 |
| | | | 725/32 |
| 2013/0278734 A1* | 10/2013 | Yang | G06Q 30/0241 |
| | | | 348/51 |
| 2013/0311273 A1* | 11/2013 | Huang | G06Q 30/0251 |
| | | | 705/14.48 |
| 2013/0311307 A1* | 11/2013 | Huang | G06Q 30/0251 |
| | | | 705/14.73 |
| 2013/0311308 A1* | 11/2013 | Huang | G06Q 30/0275 |
| | | | 705/14.73 |
| 2014/0046769 A1* | 2/2014 | Tajima | G06Q 30/0255 |
| | | | 705/14.64 |
| 2014/0082532 A1* | 3/2014 | Sheppard | G06F 3/0484 |
| | | | 715/762 |
| 2014/0278969 A1* | 9/2014 | Newell | G06Q 30/0276 |
| | | | 705/14.53 |
| 2015/0193688 A1* | 7/2015 | Thieberger | G06N 5/046 |
| | | | 706/12 |
| 2015/0231505 A1* | 8/2015 | Imai | A63F 13/323 |
| | | | 463/29 |
| 2015/0254281 A1* | 9/2015 | Sauve | G06T 13/80 |
| | | | 348/239 |
| 2015/0358679 A1* | 12/2015 | Mallinson | G06F 16/433 |
| | | | 725/78 |
| 2015/0358689 A1* | 12/2015 | Wen | H04N 21/4331 |
| | | | 725/32 |
| 2016/0019602 A1* | 1/2016 | Jeong | G06Q 30/0241 |
| | | | 705/14.73 |
| 2016/0063577 A1* | 3/2016 | Yellin | G06Q 30/0277 |
| | | | 705/14.73 |
| 2016/0283056 A1* | 9/2016 | Kaminosono | G06Q 30/02 |
| 2016/0314655 A1* | 10/2016 | Tsaur | G07F 17/323 |
| 2017/0048351 A1* | 2/2017 | Wakizaki | H04L 67/32 |
| 2017/0113143 A1* | 4/2017 | Marr | A63F 13/355 |
| 2017/0186052 A1* | 6/2017 | Yang | G06Q 30/0277 |
| 2017/0263075 A1* | 9/2017 | Arnone | G07F 17/3225 |
| 2017/0278289 A1* | 9/2017 | Marino | G06Q 30/0276 |
| 2017/0354884 A1* | 12/2017 | Benedetto | A63F 13/493 |
| 2018/0005456 A1* | 1/2018 | Vijayaraghavan | G06F 16/51 |
| 2018/0020243 A1* | 1/2018 | Ni | H04N 21/23418 |
| 2018/0021684 A1* | 1/2018 | Benedetto | A63F 13/493 |
| | | | 463/24 |
| 2018/0225911 A1* | 8/2018 | Washington | G07F 17/323 |
| 2018/0280802 A1* | 10/2018 | Stroud | A63F 13/63 |
| 2018/0290054 A1* | 10/2018 | Perry | H04L 65/80 |
| 2019/0015741 A1* | 1/2019 | Morishita | A63F 13/332 |
| 2019/0066165 A1* | 2/2019 | Morishita | G06F 16/5866 |
| 2019/0312954 A1* | 10/2019 | Morishita | H04N 21/8173 |
| 2019/0378369 A1* | 12/2019 | Washington | G07F 17/3246 |
| 2020/0001187 A1* | 1/2020 | Marr | A63F 13/792 |
| 2020/0206616 A1* | 7/2020 | Perry | H04L 65/4084 |

FOREIGN PATENT DOCUMENTS

| | | | | |
|---|---|---|---|---|
| JP | 2008-051909 A | | 3/2008 | |
| JP | 2011-060210 A | | 3/2011 | |
| JP | 2012-113355 A | * | 6/2012 | G06Q 30/02 |
| JP | 3185004 U | | 7/2013 | |
| JP | 2013-212249 A | | 10/2013 | |
| JP | 2014-038420 A | | 2/2014 | |
| JP | 2015-179404 A | | 10/2015 | |
| JP | 2017-37630 A | * | 2/2017 | G06F 17/30 |
| JP | 6218236 B2 | * | 10/2017 | G06F 9/445 |
| JP | 2020-96660 A | * | 6/2020 | G06Q 50/10 |
| TW | I536805 B | * | 6/2016 | H04N 19/169 |
| WO | WO 2007/132753 A1 | * | 11/2007 | G06F 13/00 |
| WO | WO 2018/080270 A1 | * | 5/2018 | G06T 11/60 |
| WO | WO 2020/003555 A1 | * | 1/2020 | G06F 13/00 |

* cited by examiner

FIG. 5a

| ADVERTISEMENT ID | DISTRIBUTION PERIOD | DISTRIBUTOR ID | DISTRIBUTION RANGE | ADVERTISEMENT INFORMATION | IMAGE ATTRIBUTE ||||| 
|---|---|---|---|---|---|---|---|---|---|
| | | | | | DATE AND TIME | PLACE | CHARACTER | TYPE | SCENE |
| A1 | T1 | D1 | R1 | C1 | Y1 | XX TOWER | NONE | MOVING IMAGE | NONE |
| A2 | T2 | D2 | R2 | C2 | Y2 | JAPAN | ONLY MALE | STILL IMAGE | NONE |
| A3 | T3 | D3 | R3 | C3 | Y3 | TOKYO | ONLY FEMALE | STILL IMAGE | NONE |
| A4 | T4 | D4 | R4 | C4 | Y4 | NONE | CHARACTER A OF GAME XX | STILL IMAGE | VICTORY OF CHARACTER A |
| A5 | T5 | D5 | R5 | C5 | Y5 | NONE | NONE | MOVING IMAGE | BATTLE IN DUNGEON B |

FIG. 5b

| IMAGE ID | SAVED LOCATION | THUMBNAIL | DATE AND TIME | PLACE | CHARACTER | TYPE | SCENE |
|---|---|---|---|---|---|---|---|
| i1 | LOCAL | s1 | MARCH 30, 2017 | NONE | NONE | MOVING IMAGE | BATTLE IN DUNGEON B |
| i2 | LOCAL | s2 | FEBRUARY, 2015 | SAITAMA | X | MOVING IMAGE | NONE |
| i3 | CLOUD | s3 | JANUARY 11, 2017 | TOKYO | ONLY FEMALE | MOVING IMAGE | NONE |
| i4 | CLOUD | s4 | AUGUST 6, 2016 | NONE | CHARACTER A OF GAME XX | STILL IMAGE | VICTORY OF CHARACTER A |
| i5 | CLOUD | s5 | JANUARY 1, 2017 | TOKUSHIMA | NONE | STILL IMAGE | LANDSCAPE |

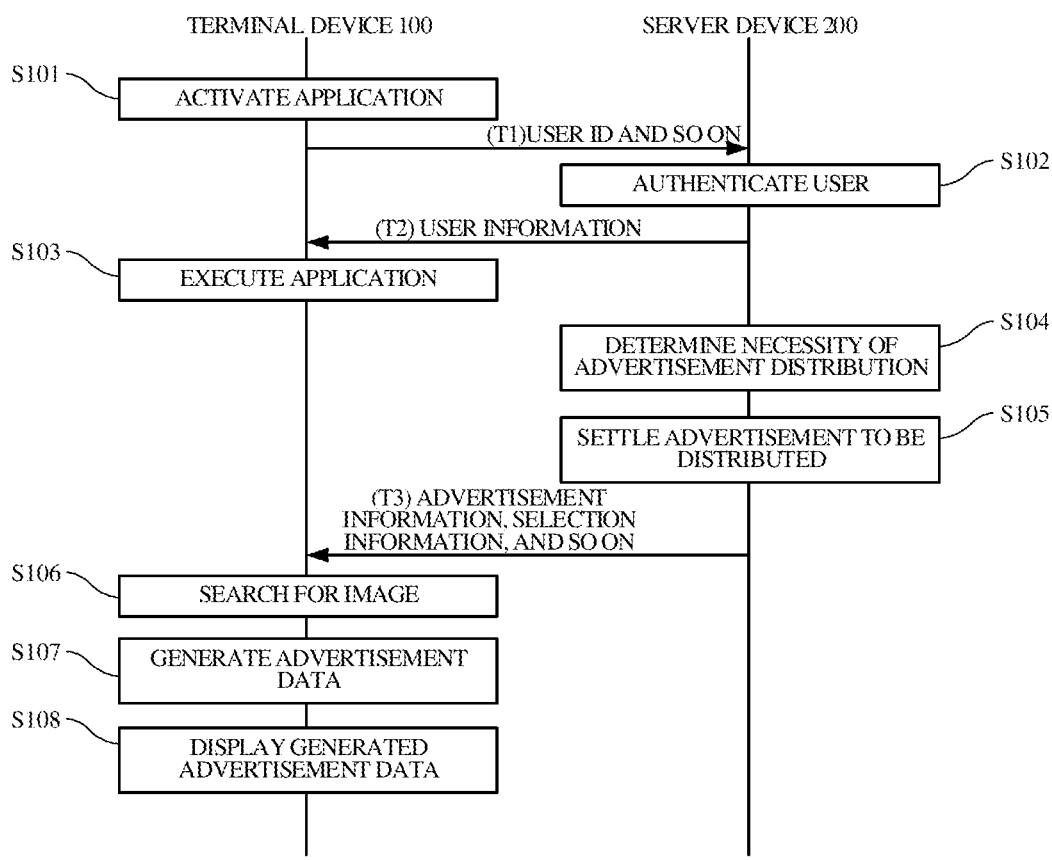

TERMINAL DEVICE, PROGRAM, AND METHOD

CROSS-REFERENCE TO RELATED APPLICATION

The present application is a continuation application of International Application No. PCT/JP2017/030305, filed on Aug. 24, 2017 which is expressly incorporated herein by reference in its entirety.

BACKGROUND

The present disclosure relates to a terminal device, a program, and a method capable of displaying an advertisement including a predetermined image.

Conventionally, a terminal device capable of displaying an advertisement based on advertisement data transmitted from an advertisement distribution server device while a predetermined application is being executed is known.

For example, Japanese Patent Publication No. 2002-297993 describes that a banner advertisement is displayed on a portal screen displayed on a terminal device and, when a user clicks on the displayed banner advertisement, an advertisement content is displayed to the user.

SUMMARY

Therefore, by taking the technology as described above into account, the present disclosure provides a terminal device, a program, or a method capable of displaying an advertisement that draws a higher attention of a user according to various embodiments.

One aspect of the present disclosure provides "terminal device comprising: a communication interface, which is communicably connected to a server device via a network, configured to receive selection information on an image to be included in an advertisement from the server device; a memory configured to store computer-readable instructions; a processor configured to execute the computer-readable instructions so as to: select one or a plurality of images as the image to be included in the advertisement based on the selection information received by the communication interface from among images stored in the memory or stored in a storage device connected via the network in association with predetermined user identification information; and a display configured to display the advertisement including the selected image."

One aspect of the present disclosure provides "a computer program product embodying computer-readable instructions stored on a non-transitory computer-readable medium for causing a computer to execute a process by a processor, the computer including: a communication interface, which is communicably connected to a server device via a network, configured to receive selection information on an image to be included in an advertisement from the server device; and a display configured to display the advertisement, the computer configured to perform the steps of: selecting one or a plurality of images as the image to be included in the advertisement based on the selection information received by the communication interface, from among images stored in the memory or stored in a storage device connected via the network in association with predetermined user identification information."

One aspect of the present disclosure provides "a method for causing a processor in a terminal device to execute a process, the terminal device comprising: a communication interface, which is communicably connected to a server device via a network, configured to receive selection information on an image to be included in an advertisement from the server device; a memory configured to store computer-readable instructions; and a display configured to display the advertisement, the method comprising executing on the processor based on the computer readable instructions the step of selecting one or a plurality of images as the image to be included in the advertisement based on the selection information received by the communication interface from among images stored in the memory or stored in a storage device connected via the network in association with predetermined user identification information."

According to various embodiments of the present disclosure, a terminal device, a program, or a method capable of displaying an advertisement that draws a higher attention of a user can be provided.

Note that the above-mentioned effects are merely exemplary effects for the convenience of description and are not restrictive. In addition to or instead of the above effects, it is also possible to achieve any effect described in the present disclosure and an effect apparent to those skilled in the art.

BRIEF DESCRIPTION OF DRAWINGS

FIG. 5a is a diagram conceptually illustrating an advertisement information table stored in the server device 200 according to the first embodiment of the present disclosure. Further, FIG. 5b is a diagram conceptually illustrating an image information table stored in the terminal device 100 according to the first embodiment of the present disclosure.

FIG. 6 is a diagram illustrating a processing sequence between the terminal device 100 and the server device 200 according to the first embodiment of the present disclosure.

DESCRIPTION OF EXEMPLARY EMBODIMENTS

Figure 1:
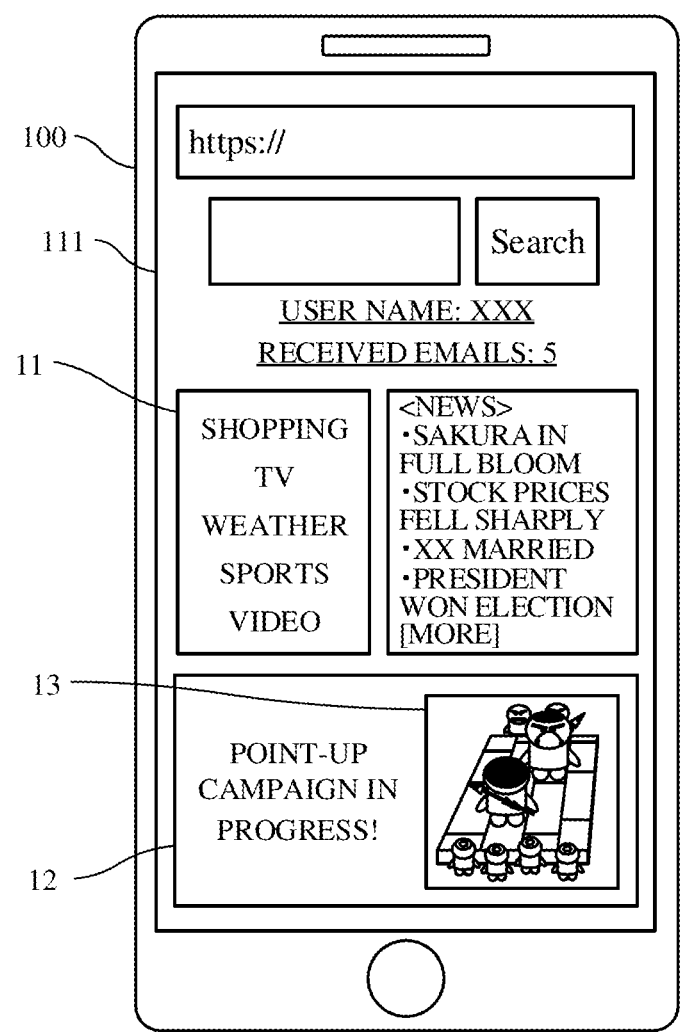
FIG. 1 is a diagram conceptually illustrating an advertisement displayed on a terminal device 100 by a system according to various embodiments of the present disclosure.

Various embodiments of the present disclosure will be described with reference to the accompanying drawings. Note that the same reference numerals are assigned to common structural elements in the drawings.

<Outline of System According to Present Disclosure>

As an example, a system according to various embodiments of the present disclosure is exemplified by a system for selecting, while an advertisement is displayed on a part of a screen of an application being executed by a user, one or a plurality of images as advertisement images based on selection information on image received from a server device, from among images stored in a memory of a terminal device or images stored in a cloud server device in association with user identification information on this user.

FIG. 1 is a diagram conceptually illustrating an advertisement displayed on a terminal device 100 by a system according to various embodiments of the present disclosure. Specifically, according to FIG. 1, an advertisement 12 including an image 13 stored in a memory 117 of the terminal device 100 is displayed on a display 111 of the terminal device 100 in addition to a browser image 11 during the execution of a browser application. At this time, the image 13 is an image appropriately selected from among images stored in the memory 117 based on the selection information on image received from a server device 200 via a communication interface of the terminal device 100.

That is, according to various embodiments of the present disclosure, an image to be displayed as an advertisement is not appropriately selected by the server device 200 but is selected by the terminal device 100 from among images stored in the terminal device 100 of the user or an external storage device 400 (for example, a cloud server device) based on the selection information on the image to be displayed when this selection information is transmitted from the server device 200. Therefore, since the advertisement to be displayed includes an image highly relevant to the user, it is possible to further increase the degree of attention to this advertisement.

Note that FIG. 1 has described a case where the advertisement is displayed during the execution of the browser application but the advertisement may be displayed during the execution of any of a mail application, a social networking (SNS) application, a game application, a schedule application, and so on. That is, the system of the present disclosure can be suitably applied to any application as long as the application is executable in the terminal device 100.

In addition, FIG. 1 has described a case where an image to be displayed as an advertisement is selected from among images of the user stored in the own terminal device 100 of the user or the external storage device 400 but the images are not limited to only the images personally taken by the user. For example, the images may include an image taken by another user, an image automatically taken by an application, and an image generated to reproduce a specific scene based on log information obtained during the execution of an application.

First Embodiment

Figure 2:
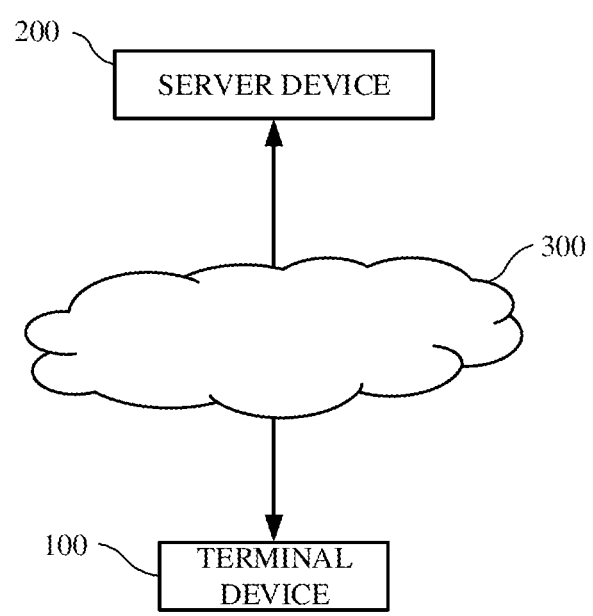
FIG. 2 is a conceptual diagram schematically illustrating the configuration of a system 1 according to a first embodiment of the present disclosure.

1. Configuration of System 1 According to First Embodiment of Present Disclosure FIG. 2 is a conceptual diagram schematically illustrating the configuration of a system 1 according to a first embodiment of the present disclosure. Referring to FIG. 2, the system 1 includes the terminal device 100 and the server device 200 communicably connected to the terminal device 100 via a network 300. The server device 200 and the terminal device 100 communicate with each other as needed to transmit and receive various types of information (for example, FIGS. 5a and 5b), a program, and so on necessary for the progress of an application.

Note that the example in FIG. 2 depicts only one terminal device 100 but it is of course possible to include a plurality of terminal devices. In addition, although the server device 200 is depicted as a single device, each structural element and processing of the server device 200 also can be allocated to a plurality of server devices. Furthermore, it is also possible to use a dedicated server device as the server device 200 as an advertisement distribution server device that executes the system according to the present embodiment. A server device capable of executing also a function other than the function according to the system of the present embodiment also can be used as the server device 200.

2. Configuration of Terminal Device 100

Figure 3:
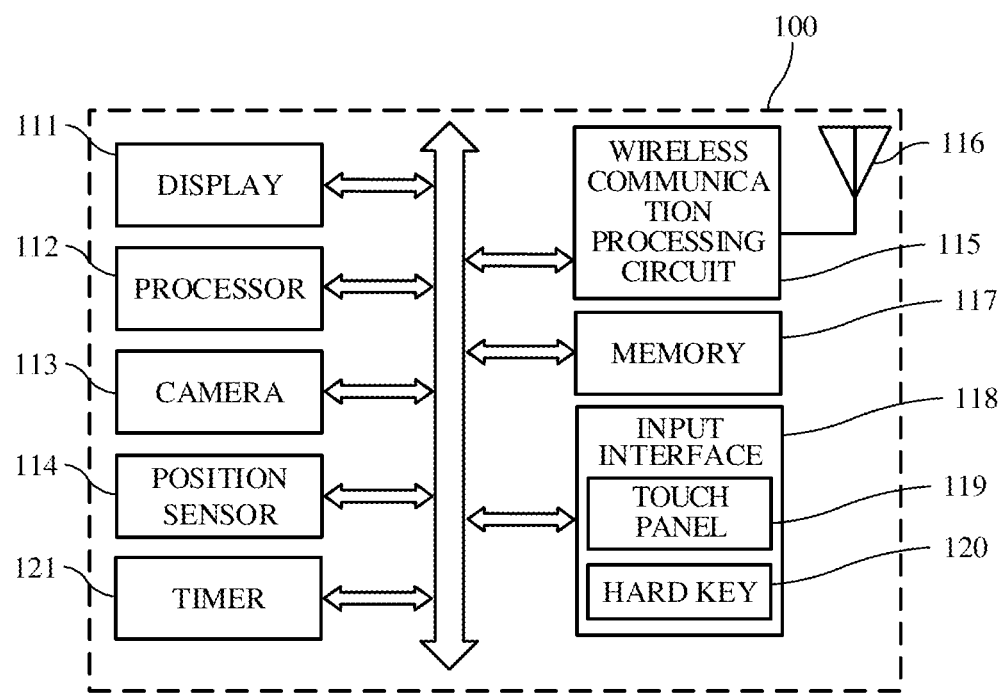
FIG. 3 is a block diagram illustrating an example of the configuration of the terminal device 100 according to the first embodiment of the present disclosure.

FIG. 3 is a block diagram illustrating an example of the configuration of the terminal device 100 according to the first embodiment of the present disclosure. The terminal device 100 does not necessarily need to include all of the structural elements illustrated in FIG. 3. Accordingly, a configuration in which a part thereof is omitted can be also employed and another structural element can be also added.

As an example, the terminal device 100 is exemplified by a portable terminal device capable of wireless communication represented by a smartphone. In addition to this portable terminal device, however, the present invention can be suitably applied to a device such as a portable game machine, a feature phone, a portable information terminal, a PDA, a laptop personal computer, and a desktop personal computer as long as the device is a terminal device capable of communicating with the server device 200 and capable of displaying advertisements. Furthermore, when a plurality of terminal devices is used, respective terminal devices are not absolutely required to be the same or of a similar type. For example, the terminal device 100 may be a smartphone and another terminal device may be a laptop personal computer.

According to FIG. 3, the terminal device 100 includes the display 111, a processor 112, a camera 113, a position sensor 114, a timer 121, a communication interface including a wireless communication processing circuit 115 and an antenna 116, the memory 117 including at least a RAM, a ROM, or a nonvolatile memory (an HDD in some cases), an input interface 118 including a touch panel 119 and a hard key 120. Additionally, these structural elements are electrically connected to each other via a control line and a data line.

The display 111 functions as a display unit that reads image information stored in the memory 117 and performs various displays (for example, FIG. 8 or 9) according to an instruction from the processor 112. Specifically, the display 111 displays an advertisement including an image selected as an image included in the advertisement and advertisement information such as a product name, an image related to a predetermined application, and the like. The display 111 is constituted by, for example, a liquid crystal display.

The processor 112 is constituted by a CPU (microcomputer) and functions as a control unit that controls another connected structural element based on various programs stored in the memory 117. The processor 112 executes an instruction command stored in the memory 117, namely, a program for executing the system according to the present embodiment and a program for executing an OS. Specifically, the processor 112 executes processing of selecting one or a plurality of images as images to be included in an advertisement from among images stored in the memory 117 based on the selection information received from the server device 200 via the communication interface. In addition, the processor 112 also can execute processing of capturing a screen displayed on the display 111 during the execution of an application such as a game application based on an instruction input from a user or based on a timing defined in advance. The processor 112 also can execute processing of collecting operation log information on an application such as a game application while the application is being executed and generating an image that reproduces a specific scene based on the collected operation log information. Note that the processor 112 may be constituted by a single CPU but also may be constituted by a plurality of CPUs. In addition, another kind of processor such as a GPU specialized for image processing may be appropriately combined.

The camera 113 includes an image sensor such as a CCD or a CMOS, a lens, and a mirror. The camera 113 functions as an imaging unit that, together with an image processing circuit (not illustrated), detects light with the image sensor and performs processing such as conversion and compression on a detected signal to generate an image. The camera 113 executes imaging processing for an image based on an instruction input from the user detected by the input interface 118. An image taken by the camera 113 is saved to an image information table in the memory 117 in association with various items of attribute information.

As an example, a GPS sensor is used as the position sensor 114 to function as a position detection unit. Once an instruction input for imaging is made by the camera 113, the GPS sensor detects the current position of the terminal device 100 by communicating with a plurality of satellites. Information on the detected position is stored to the memory 117 as the attribute information on an image taken by the camera 113 in association with this image under the control of the processor 112. Note that, in the present embodiment, the current position has been detected by the position sensor 114. However, the current position is not limited to this case and also can be detected based on information on a wifi access point or a base station of broadband wireless communication.

The timer 121 functions as a time counting unit. Once an instruction input for imaging is made by the camera 113, the timer 121 detects the time when the imaging was performed. The detected time is stored to the memory 117 as the attribute information on an image taken by the camera 113 in association with this image under the control of the processor 112.

The wireless communication processing circuit 115 functions as a communication interface together with the connected antenna 116. The communication interface performs processing such as modulation and demodulation in order to transmit and receive information to and from the server device 200 and another device connected via the network. As an example, the communication interface receives, from the server device 200, the selection information on an image to be included in an advertisement and the advertisement information similarly to be included in an advertisement.

The communication interface is processed based on a broadband wireless communication technique represented by a wideband-code division multiple access (W-CDMA) technique but also can be processed based on a technique related to narrow band wireless communication such as a wireless LAN represented by IEEE 802.11 or Bluetooth (registered trademark).

Wired communication also can be used as the communication interface instead of or in addition to wireless communication. In that case, a communication processing circuit for wired communication is simply provided instead of or in addition to the wireless communication processing circuit 115.

The memory 117 is constituted by a RAM, a ROM, or a nonvolatile memory (an HDD in some cases) and functions as a storage unit. The ROM stores an instruction command for executing an application according to the present embodiment and an OS as a program. The RAM is a memory used for writing and reading data while the program stored in the ROM is being processed by the processor 112. The nonvolatile memory is a memory in which writing and reading of data are executed by executing that program and data written therein is kept even after the execution of that program is terminated. As an example, in addition to various images such as an image taken by the camera 113, an image received from the outside via the communication interface, and an image generated based on an operation log of an application, the image information table illustrated in FIG. 5b is stored in the memory 117.

The input interface 118 is constituted by the touch panel 119 and/or the hard key 120, and so on and accepts various instructions and inputs from the user. The touch panel 119 is arranged so as to cover the display 111 and outputs information on position coordinates corresponding to image data displayed by the display 111 to the processor 112. As a touch panel technique, a publicly known technique such as a resistive film technique, a capacitive coupling technique, or an ultrasonic surface acoustic wave technique can be utilized. In the present embodiment, the input interface 118 is used for an instruction input for imaging by the camera 113 and an operation input to an application.

3. Configuration of Server Device 200

Figure 4:
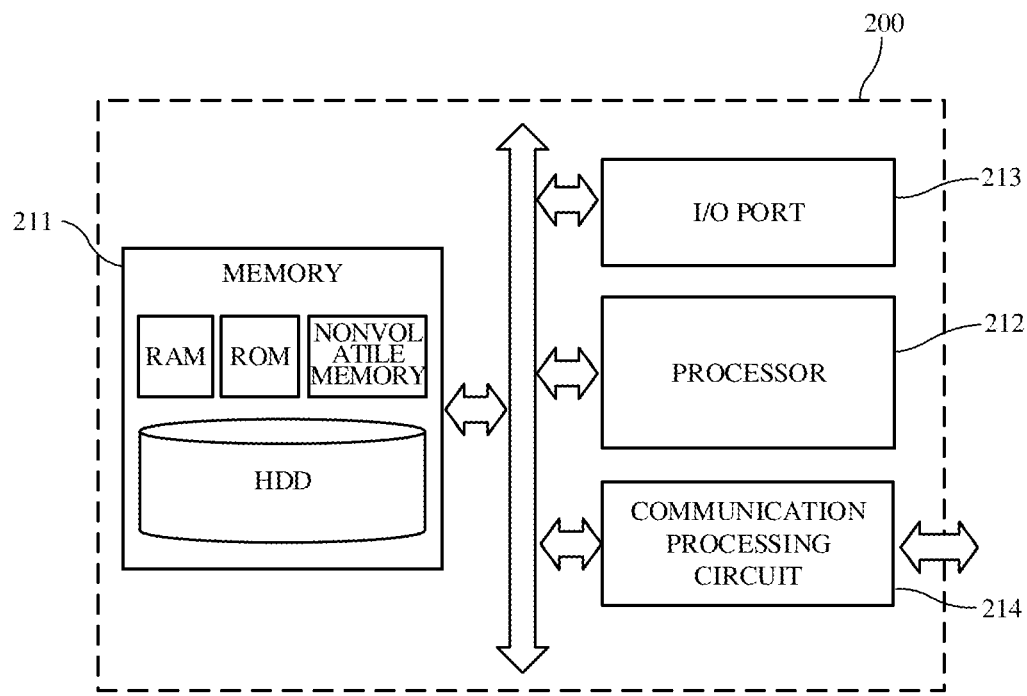
FIG. 4 is a block diagram illustrating an example of the configuration of a server device 200 according to the first embodiment of the present disclosure.

FIG. 4 is a block diagram illustrating an example of the configuration of the server device 200 according to the first embodiment of the present disclosure. The server device 200 does not necessarily need to include all of the structural elements illustrated in FIG. 4. Accordingly, a configuration in which a part thereof is omitted also can be employed and another structural element also can be added.

According to FIG. 4, the server device 200 includes a memory 211 including a RAM, a ROM, a nonvolatile memory, an HDD, and so on, a processor 212 constituted by a CPU or the like, and a communication interface having an I/O port 213 and a communication processing circuit 214. Additionally, these structural elements are electrically connected to each other via a control line and a data line.

The memory 211 includes the RAM, the ROM, the nonvolatile memory, and the HDD and functions as a storage unit. Additionally, this memory 211 stores an instruction command for executing an application according to the present embodiment and an OS as a program. Such a program is loaded and executed by the processor 212. Meanwhile, the memory 211 stores an advertisement information table depicted in FIG. 5a. Furthermore, this memory (particularly, the RAM) is temporarily used to execute writing and reading of data while the above program is being executed by the processor 212.

The processor 212 is constituted by a CPU (microcomputer) and functions as a control unit for executing instruction commands stored in the memory 211, namely, various programs to control another connected structural element. For example, the processor 212 executes processing of determining the necessity of an advertisement to be displayed on the terminal device 100 and settling an advertisement ID to be distributed according to a result of the determination. The processor 212 also executes processing of transmitting, to the terminal device 100, the selection information on image (at least one of time information, place information, character information, image type information, scene information, and so on) and the advertisement information to be displayed as an advertisement together with the selected image based on the settled advertisement ID. Note that the processor 212 may be constituted by a single CPU but also may be constituted by a plurality of CPUs.

As an example, the communication processing circuit 214 performs processing such as modulation and demodulation to transmit and receive a program, various types of information, and so on for executing a game application according to the present embodiment to and from the terminal device 100 via the network 300 or to and from another server device via the network 300. The communication processing circuit 214 communicates with each terminal device and another server device in accordance with a publicly known wireless communication technique or a publicly known wired communication technique. In the present embodiment, as an example, the communication processing circuit 214 executes processing for transmitting the advertisement information and the selection information specified through the processing by the processor 212.

Although not particularly illustrated, the I/O port 213 functions as an information input/output unit for inputting and outputting information from and to various external appliances such as a printer. The I/O port 213 can adopt a publicly known connection format such as a serial port, a parallel port, a USB, and so on as desired.

4. Information Stored in Memory 211 of Server Device 200

FIG. 5a is a diagram conceptually illustrating the advertisement information table according to the first embodiment of the present disclosure. As an example, the advertisement information table is stored in the HDD of the memory 211 of the server device 200.

According to FIG. 5a, a distribution period, a distributor ID (distributor identification information), a distribution range, advertisement information, and an image attribute are individually stored in association with the advertisement ID (advertisement identification information). "Advertisement ID" is unique information given to each advertisement and serves as information for specifying each advertisement. "Distribution period" indicates a period during which an advertisement is distributed to each terminal device. "Distributor ID" is information specifying who has provided an advertisement to be distributed and is information specifying a client of an advertisement distribution service using the server device 200. "Distribution range" indicates information regarding a range in which an advertisement is distributed. Examples of this range include a geographical range such as "Japan", "Tokyo", and the like and a range such as age group and sex. "Advertisement information" indicates information other than an image selected by the terminal device 100 among the various items of information constituting an advertisement to be distributed. As an example, the advertisement information includes arrangement information on an image to be selected, arrangement information on an advertisement on the display 111 of the terminal device 100, drawing information such as the size of an advertisement, and text information to be displayed together with an image to be selected (for example, "Point-up Campaign in Progress!"). As an example, "image attribute" includes at least one of date and time, place, character, type, scene, and so on. The image attribute serves as the selection information on an image to be transmitted to the terminal device 100. That is, the image attribute is information designating a selection condition used when the terminal device 100 selects an image constituting a part of an advertisement to be displayed on the terminal device 100. In FIG. 5a, for example, when an advertisement with an advertisement ID of "A1" is distributed, "moving image" taken at "xx tower" during a period of "Y1" is designated as a selection condition for an image to be included in this advertisement. Meanwhile, for example, when an advertisement with an advertisement ID of "A4" is distributed, "still image" generated so as to reproduce "scene of victory of character A" during a period of "Y4" and include "character A of game xx" in this image is designated as a selection condition for an image to be included in this advertisement.

The advertisement information stored in FIG. 5a is created in such a manner that, for example, a client of the advertisement distribution requests a provider of the advertisement distribution service and the provider carries out registration processing in the server device 200.

FIG. 5b is a diagram conceptually illustrating the image information table according to the first embodiment of the present disclosure. As an example, the image information table is stored in the memory 117 of the terminal device 100.

According to FIG. 5b, a saved location, a thumbnail, and the image attribute (date and time, place, character, type, scene, and so on) are individually stored in association with an image ID (image identification information). "Image ID" is unique information given to each image and serves as information for specifying each image. "Saved location" designates an address within the memory 117 of the terminal device 100 where image data itself (jpg or the like) of an image specified by the image ID is saved. "Thumbnail" stores data of an image reduced from actual image data to be displayed on an image list screen or the like. "Date and time" stores the time at which each image specified by the image ID was taken or generated. Note that the time at which the image was taken or generated is a mere example and, for example, the time at which the image was stored to the memory 117 or the like or the time at which the image was received at the terminal device 100 may be employed. "Place" stores a place where each image specified by the image ID was taken or generated. A place detected by the position sensor 114 or the like at the time of taking an image is stored but a place specified using a publicly known image recognition technology may be stored. In addition, when an image is received from the outside, position information stored as metadata of the received image may be stored. "Character" is information for specifying a person or a character included in each image specified by the image ID. The character may be any of information recognized using a publicly known face/object recognition technology, information personally input by the user, and so on. "Type" specifies the data format of each image specified by the image ID and is basically information for distinguishing whether each image is a moving image or a still image. "Scene" stores information regarding a scene in which each image specified by the image ID is taken or generated. Scene information recognized using a publicly known image recognition technology, scene information personally input by the user, scene information recognized using an operation log of an application, and the like can be used as the scene.

5. Processing Sequence Between Terminal Device 100 and Server Device 200

FIG. 6 is a diagram illustrating a processing sequence between the terminal device 100 and the server device 200 according to the first embodiment of the present disclosure. According to FIG. 6, this processing sequence is started when the user operates the input interface 118 of the own terminal device 100 of the user and inputs an instruction for activation of any application. Upon detecting an instruction input for activating the application by the user, the terminal device 100 activates the instructed application (S101). Subsequently, the terminal device 100 transmits a user ID of this user to the server device 200 (T1). Upon receiving the user ID, the server device 200 refers to a user information table in which user information necessary for executing this application is stored in association with the user ID to authenticate the user (S102) and also transmits the user information necessary for executing this application to the terminal device 100 (T2). The terminal device 100 executes this application according to the received user information and/or the instruction input by the user (S103).

Thereafter, at a predetermined timing, the server device 200 determines the necessity of advertisement distribution defined in advance to the terminal device 100 that is executing this application (S104). Note that the necessity of advertisement distribution is determined by appropriately combining various conditions which are not particularly illustrated but, as an example, include whether an advertisement distribution demand has been received from the terminal device 100 and whether a distribution time of an advertisement defined in advance has come.

Next, when it is determined in S103 that an advertisement is to be distributed, the server device 200 settles an advertisement to be distributed (S105). In addition, an advertisement to be distributed is settled by appropriately combining various conditions which are not particularly illustrated but, as an example, include information on a user executing the application (age, sex, preference, operation history, and so on), time, the location of a distribution destination. Then, the server device 200 refers to the advertisement information table illustrated in FIG. 5a and transmits, to the terminal device 100, advertisement display information including the advertisement information and the selection information (image attribute) associated with the advertisement ID of the advertisement settled to be distributed (T3).

Upon receiving the advertisement information, the selection information, and so on, the terminal device 100 refers to the image information table illustrated in FIG. 5b and searches for an image matching the transmitted selection information, that is, the selection condition for the image (S106). Next, the terminal device 100 generates advertisement data based on the found image and the received advertisement information (S107) and displays an advertisement on the display 111 based on the generated advertisement data (S108).

6. Processing Flow of Terminal Device 100

Figure 7:
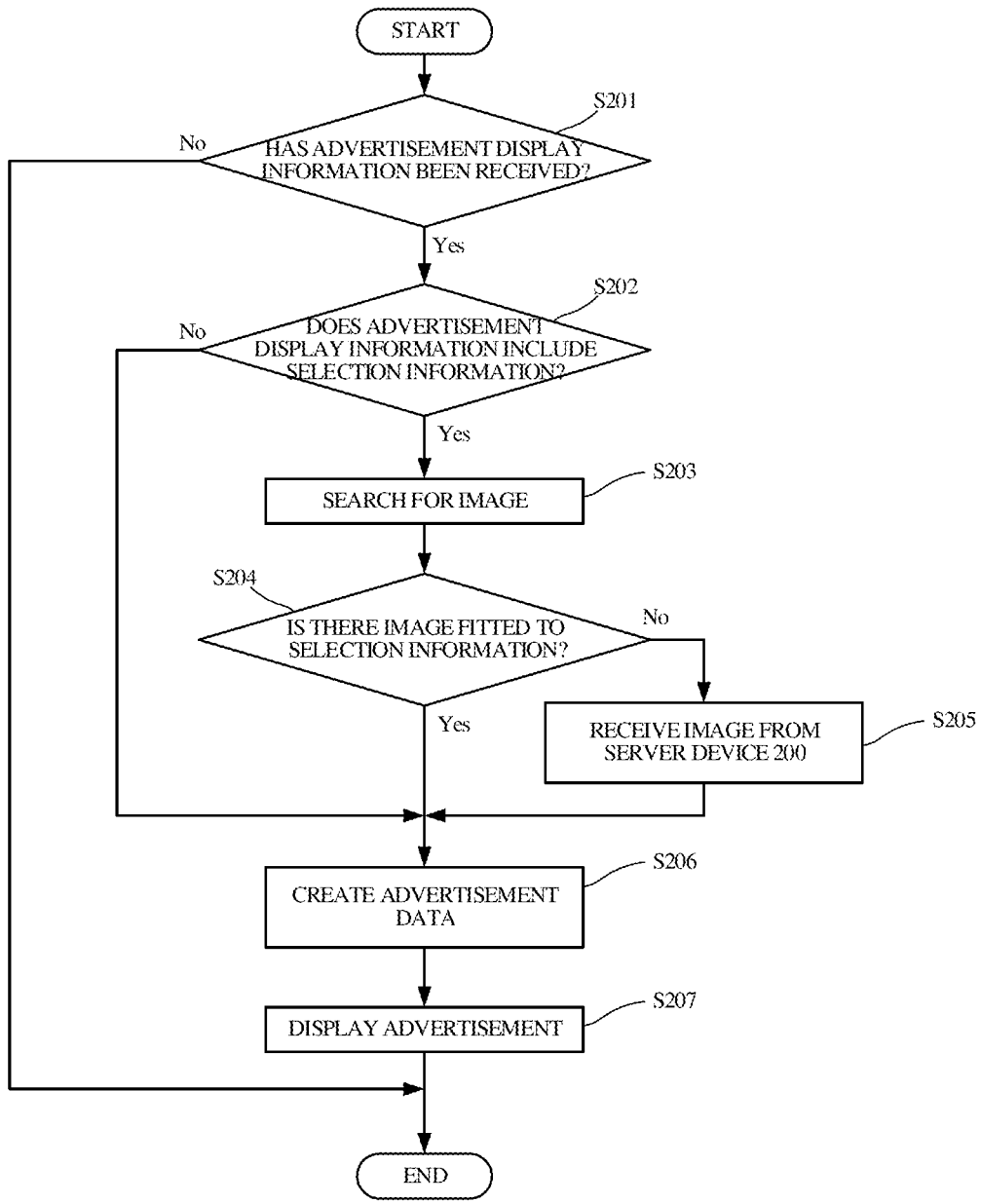
FIG. 7 is a diagram illustrating a processing flow executed in the terminal device 100 according to the first embodiment of the present disclosure.

FIG. 7 is a diagram illustrating a processing flow executed in the terminal device 100 according to the first embodiment of the present disclosure. Specifically, the processing flow depicted in FIG. 7 is performed by the processor 112 reading the instruction command (program) stored in the memory 117 to execute during the execution of a desired application. In addition, as an example, the processing flow depicted in FIG. 7 is repeated at intervals defined in advance.

Note that, in FIG. 7, a case where an advertisement is displayed during the execution of the browser application will be described. However, the processing flow is not limited to the browser application and it is of course possible to display an advertisement also during the execution of other applications. Examples of other applications include a mail application, a social networking (SNS) application, a game application, and a schedule application.

According to FIG. 7, the processor 112 first determines whether the communication interface has received the advertisement display information from the server device 200 (S201). Note that the advertisement display information is generated in a case where an advertisement to be distributed by the server device 200 is settled in S105 of FIG. 6 and includes the advertisement information and/or the selection information. Then, when the processor 112 determines that the advertisement display information has not been received, this processing flow is terminated as it is. On the other hand, when the processor 112 determines that the advertisement display information has been received, the processor 112 determines whether the received advertisement display information includes the selection information which serves as a selection condition for an image to be displayed (S202). When the selection information is not included in the advertisement display information, the processor 112 creates the advertisement data based only on the advertisement information included in the advertisement display information (S206). On the other hand, when the selection information is included in the advertisement display information, the processor 112 refers to the image attribute (date and time, place, character, type, scene, and so on) in the image information table illustrated in FIG. 5b and searches for an image fitted to this selection information (S203).

When there is an image fitted to the selection information, the processor 112 refers to the saved location associated with the image ID of this image and creates the advertisement data from the stored image data and the advertisement information included in the advertisement display information (S206). On the other hand, when there is no image fitted to the selection information, the processor 112 controls to receive alternative image data from the server device 200 (S205) and creates the advertisement data from the received alternative image data and the advertisement information (S206). Note that the alternative image data may be received from the server device 200 only in a case where there is no fitted image in the determination in S204 or may be configured in advance to be received in S201 together with the advertisement display information.

Then, once the advertisement data is generated in S206, the processor 112 controls to display an advertisement on the display 111 of the terminal device 100 based on the generated advertisement data (S207).

Figure 8:
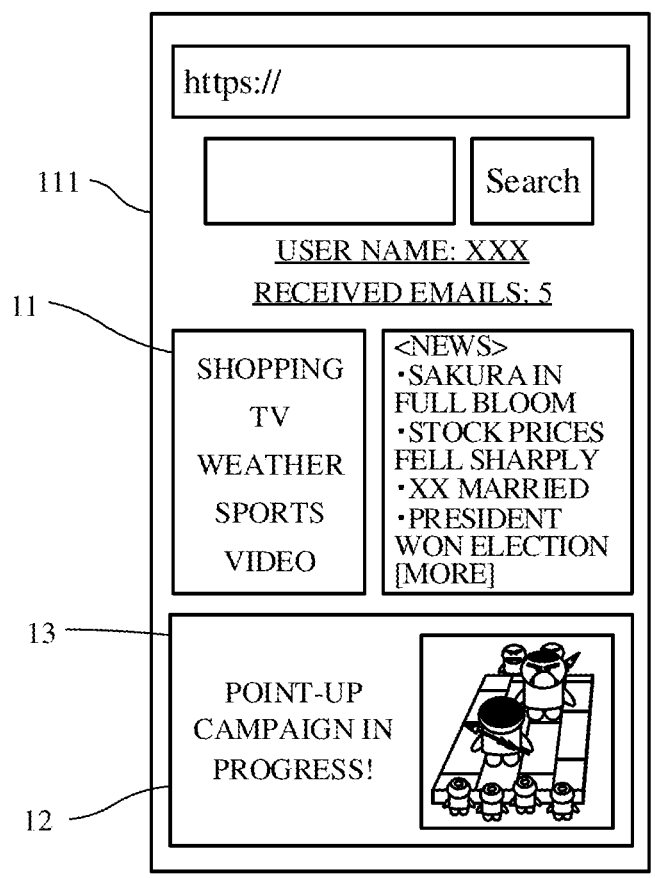
FIG. 8 is a diagram illustrating an example of a screen displayed on a display 111 of the terminal device 100 according to the first embodiment of the present disclosure.

FIG. 8 is a diagram illustrating an example of a screen displayed on the display 111 of the terminal device 100 according to the first embodiment of the present disclosure. Specifically, FIG. 8 illustrates an example of a screen on which an advertisement is displayed based on the advertisement display information received during the execution of the browser application.

According to FIG. 8, in addition to the browser image 11 which is a content received from the server device 200 or another server device, an advertisement 12 including an image 13 stored in the memory 117 of the terminal device 100 is displayed on the display 111 in addition to text such as "Point-up Campaign in Progress!" generated based on the received advertisement information, and so on.

The example in FIG. 8 illustrates a case where the image attribute (date and time="Y5" (2017), place="none", character="none", type="moving image", scene="battle in Dungeon B") associated with an advertisement ID of A5 in FIG. 5a is received from the server device 200 as the selection information. When the above selection information is received by the communication interface, the processor 112 searches for an image matching the above selection information with reference to FIG. 5b. According to FIG. 5b, an image having an image ID of i1 storing image attributes of date and time="Mar. 30, 2017", place="none", character="none", type="moving image", and scene="battle in Dungeon B" matches the above selection information. Therefore, in the example in FIG. 8, image data with the image ID=i1 is displayed as the image i3.

Here, the image with the image ID=i1 is an image (moving image) that reproduces a battle scene in the Dungeon B based on the operation log information obtained when a game application was executed previously in the terminal device 100.

Figure 9:
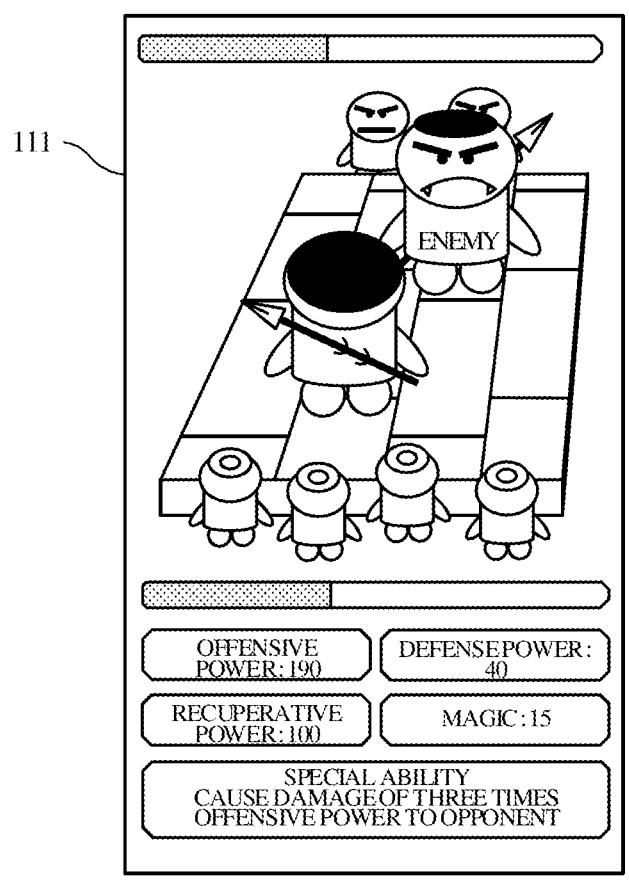
FIG. 9 is a diagram illustrating an example of a screen displayed on the display 111 of the terminal device 100 according to the first embodiment of the present disclosure.

FIG. 9 is a diagram illustrating an example of a screen displayed on the display 111 of the terminal device 100 according to the first embodiment of the present disclosure. Specifically, FIG. 9 indicates an image of a battle scene in the Dungeon B in a game application being executed in the terminal device 100. In this battle scene, the battle progresses as the user holding the terminal device 100 inputs an instruction via the input interface 118. At this time, the processor 112 of the terminal device 100 stores the operation log information to the memory 117 as needed, such as the instruction input by the user, drawing data displayed on the display 111, the ability value of a user character operable by the user, and the ability value of an enemy character. Then, the processor 112 can reproduce the battle scene in the Dungeon B based on the operation log information stored in the memory 117, such as the instruction input by the user, the drawing data displayed on the display 111, the ability value of the user character operable by the user, and the ability value of the enemy character. That is, the image 13 (the image data with the image ID=i1) displayed in FIG. 8 is an image (moving image) reproduced as described above. Note that the operation log information may be collected by the user's instruction or progression to a scene defined in advance.

As described above, in the present embodiment, instead of displaying an image defined in advance in the server device 200 as an image included within an advertisement to be displayed on the display 111, an image more highly relevant to the user holding the terminal device 100 is selected to be displayed and thus, it is possible to further increase the degree of attention to this advertisement. Particularly, the user sometimes remembers a battle scene of a game application played in the past. In such a case, if the battle scene that the user personally played is displayed as an image of an advertisement, the degree of attention to this advertisement can be further increased.

In addition, in the present embodiment, when an image more highly relevant to the user holding the terminal device 100 is selected, the selection information is received from the server device 200 such that the terminal device 100 itself selects the image from among images stored in the memory 117. In other words, when such an image is selected, it is not especially necessary for the server device 200 to transmit an image stored in the memory 117. Therefore, in selecting such an image, it is possible to realize a system with higher safety even from the viewpoint of information leakage.

Second Embodiment

The first embodiment has described a case where an image to be included in an advertisement is selected from among images stored in the memory 117 of the terminal device 100. A second embodiment will describe a case where an image to be included in an advertisement is selected from among images stored in a storage device 400 (for example, a cloud server) connected via a network 300 in addition to images stored in the memory 117. Note that configurations, processing, and procedures in the present embodiment are similar to those in the first embodiment, except as specifically described below. Therefore, a detailed description of those matters will be omitted.

Figure 10:
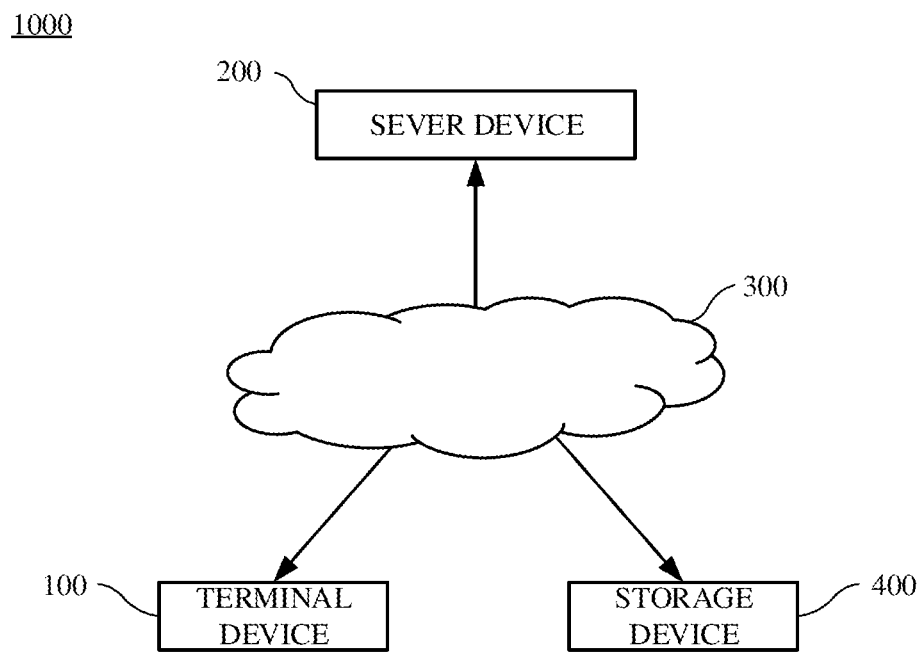
FIG. 10 is a conceptual diagram schematically illustrating the configuration of a system 1000 according to a second embodiment of the present disclosure.

FIG. 10 is a conceptual diagram schematically illustrating the configuration of a system 1000 according to the second embodiment of the present disclosure. Referring to FIG. 10, the system 1000 includes a terminal device 100, a server device 200 communicably connected to the terminal device 100 via the network 300, and the storage device 400 communicably connected to the terminal device 100 via the network 300. Note that, in FIG. 10, the storage device 400 is depicted as a single configuration but it is also possible to separately store information by arranging a plurality of storage devices. In addition, in FIG. 10, the storage device 400 is depicted as a different unit from the server device 200 but it is also possible to use a storage area generated by, for example, virtually or physically separating an area within an HDD of the server device 200 as the storage device 400.

Image data of each image is stored in the storage device 400. At least a part of the image data of the stored images is stored in association with the user identification information on the user holding the terminal device 100. Therefore, when an image to be included in an advertisement is searched for based on the selection information in S203 of FIG. 7, an image associated with the user identification information on the user holding the terminal device 100 can be included into a target to be searched from the storage device 400 based on this user identification information.

Note that the present embodiment has described a case where images stored in the memory 117 and images stored in the storage device 400 are to be searched but it is of course possible to search only the storage device 400.

As described above, in the present embodiment, similarly to the first embodiment, instead of displaying an image defined in advance in the server device 200 as an image included within an advertisement to be displayed on the display 111, an image more highly relevant to the user holding the terminal device 100 is selected to be displayed and thus, it is possible to further increase the degree of attention to this advertisement. Particularly, the user sometimes remembers a battle scene of a game application played in the past. In such a case, if the battle scene that the user personally played is displayed as an image of an advertisement, the degree of attention to this advertisement can be further increased.

In addition, in the present embodiment, when an image more highly relevant to the user holding the terminal device 100 is selected, the selection information is received from the server device 200 such that the terminal device 100 itself selects the image from among images stored in the memory 117 or images stored in the storage device 400 in association with the user identification information on the above user. In other words, when such an image is selected, it is not especially necessary for the server device 200 to transmit an image stored in the memory 117. Therefore, in selecting such an image, it is possible to realize a system with higher safety even from the viewpoint of information leakage.

Other Embodiments

In the first and second embodiments, images stored in the memory 117 and/or images stored in the storage device 400 in association with the user identification information on the user holding the terminal device 100 have been configured to be selected as an image to be displayed on an advertisement. However, the embodiments are not limited thereto and, for example, an image linked with the above user by a publicly known face authentication technology or a publicly known tagging technology from among images stored in an SNS server or another terminal device also can be configured to be selected.

In the first and second embodiments, a reproduced image generated based on the operation log information obtained when a game application was executed previously is displayed as an image included in an advertisement. However, any image can be used, such as an image taken by the user of the terminal device 100 with the camera 113, an image automatically taken by an application, and an image taken by another user.

In the first and second embodiments, when there is no fitted image in S204 of FIG. 7, the terminal device 100 has received an alternative image from the server device 200. However, among the image attributes received as the selection information, some of the attributes may be excluded from a search condition, or a search condition may be relaxed for some or all of the attributes such that the terminal device 100 can select the image from among images stored in the memory 117 or the storage device 400. Alternatively, the terminal device 100 may randomly select the image from among images stored in the memory 117 or the storage device 400.

The first and second embodiments have described a case where the image information table illustrated in FIG. 5b is stored in the memory 117. However, a storage for the image information table is not limited to the memory 117 and the image information table may be stored in a storage device or a server device including, for example, the server device 200 illustrated in FIG. 4.

It is also possible to appropriately combine the respective elements described in the respective embodiments or to replace these elements to constitute a system.

The processing and procedures described in the present description can be realized not only by those explicitly described in the embodiments but also by software, hardware or a combination thereof. Specifically, the processing and procedures described in the present description can be realized by implementing logic in agreement with the processing to a medium such as an integrated circuit, a volatile memory, a nonvolatile memory, a magnetic disk, or an optical storage. In addition, the processing and procedures described in the present description can be executed by various computers including the terminal device and the server device by implementing these processing and procedures as a computer program.

Even though the processing and procedures described in the present description are described as being executed by a single device, piece of software, component, or module, such processing or procedures can be executed by a plurality of devices, a plurality of pieces of software, a plurality of components, and/or a plurality of modules. In addition, even though various types of information described in the present description are described as being saved in a single memory or storage unit, such information can be separately saved in a plurality of memories included in a single device or a plurality of memories separately arranged in a plurality of devices. Furthermore, software and hardware elements described in the present description can be realized by integrating these elements into fewer structural elements or by breaking these elements into more structural elements.

The terminal, device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A terminal device comprising:
an input interface configured to receive an operation input from a user;
a communication interface which is communicably connected to a server device via a network;
a display configured to display an advertisement and a scene of a game;
a memory that is configured to store computer-readable instructions; and
a processor configured to execute the computer-readable instructions so as to:
    execute a game application so as to display the scene of the game on the display based on the operation input from the user;
    collect operation log information with respect to the scene of the game in the executed game application, the operation log information corresponding to the operation input and drawing data of the scene of the game;
    store the operation log information in the memory;
    cause the communication interface to receive advertisement information of a display image from the server, the display image being included in the advertisement;
    select one or more of a plurality of images as the display image to be included in the advertisement based on image selection information when the advertisement information includes the image selection information and the image selection information relating to the game application corresponds to one of the plurality of images that are stored in at least one of the memory and a storage device connected to the terminal device via the network, the plurality of images being in association with predetermined user identification information;
    create a first display image as the selected display image based on the stored operation log information in the memory when the advertisement information includes the image selection information and the image selection information relating to the game application corresponds to one of the plurality of images;
    create a second display image as the display image based on the advertisement information when the advertisement information does not include the image selection information;
    cause the communication interface to receive image data from the server when the advertisement information includes the image selection information and the image selection information relating to the game application does not correspond to any of the plurality of images;
    create a third display image as the display image based on the received image data from the server when the advertisement information includes the image selection information and the image selection information relating to the game application does not correspond to any of the plurality of images; and
    display the advertisement including either the first display image, the second display image, or the third display image as the display image on the display, wherein the first display image corresponds to reproduction of the displayed scene of the game that was displayed on the display when the game application was executed in the past.

2. The terminal device according to claim 1, wherein the memory is configured to store attribute information in association with the plurality of images.

3. The terminal device according to claim 2, wherein the attribute information includes at least one of time information, place information, character information, image type information, and scene information.

4. The terminal device according to claim 1, wherein the image selection information includes at least one of time information, place information, character information, image type information, and scene information, which is a selection condition when the processor is configured to select one or more of the plurality of images as the display image to be included in the advertisement.

5. The terminal device according to claim 1, wherein the predetermined user identification information corresponds to the user operating the terminal device.

6. The terminal device according to claim 1, wherein the selected display image is one of a still image and a moving image.

7. The terminal device according to claim 1, wherein the displayed scene was displayed on the display when the user operating the terminal device instructed the processor to execute the game application via the input interface.

8. The terminal device according to claim 1, wherein the display is configured to display the advertisement during execution of at least one of application of a browser application, a mail application, a social networking application, the game application, and a schedule application.

9. A computer program product embodying computer-readable instructions stored on a non-transitory computer-readable medium for causing a computer to execute a process by a processor, the computer including:
a communication interface which is communicably connected to a server device via a network; and
a display configured to display an advertisement and a scene of a game,
the computer configured to perform the steps of:
executing a game application so as to display the scene of the game on the display based on an operation input from a user;
collecting operation log information with respect to the scene of the game in the executed game application, the operation log information corresponding to the operation input and drawing data of the scene of the game;
storing the operation log information in a memory in the computer;
causing the communication interface to receive advertisement information of a display image from the server, the display image being included in the advertisement;
selecting one or more of a plurality of images as the display image to be included in the advertisement based on image selection information when the advertisement information includes the image selection information and the image selection information relating to the game application corresponds to one of the plurality of images that are stored in at least one of the memory and a storage device connected to the computer via the network, the plurality of images being in association with predetermined user identification information;
creating a first display image as the selected display image based on the stored operation log information in the memory when the advertisement information includes the image selection information and the image selection information relating to the game application corresponds to one of the plurality of images;
creating a second display image as the display image based on the advertisement information when the advertisement information does not include the image selection information;
causing the communication interface to receive image data from the server when the advertisement information includes the image selection information and the image selection information relating to the game application does not correspond to any of the plurality of images;
creating a third display image as the display image based on the received image data from the server when the advertisement information includes the image selection information and the image selection information relating to the game application does not correspond to any of the plurality of images; and
displaying the advertisement including either the first display image, the second display image, or the third display image as the display image on the display,
wherein the first display image corresponds to reproduction of the displayed scene of the game, and the displayed advertisement includes the displayed scene of the game that was displayed on the display when the game application was executed in the past.

10. A method for causing a processor in a terminal device to execute a process, the terminal device including:
an input interface configured to receive an operation input from a user;
a communication interface which is communicably connected to a server device via a network;
a display configured to display an advertisement and a scene of a game; and
a memory that is configured to store computer-readable instructions,
the method comprising executing the computer-readable instructions on the processor the steps of:
executing a game application so as to display the scene of the game on the display based on the operation input from the user;
collecting operation log information with respect to the scene of the game in the executed game application, the operation log information corresponding to the operation input and drawing data of the scene of the game;
storing the operation log information in the memory;
causing the communication interface to receive advertisement information of a display image from the server, the display image being included in the advertisement;
selecting one or more of a plurality of images as the display image to be included in the advertisement based on image selection information when the advertisement information includes the image selection information and the image selection information relating to the game application corresponds to one of the plurality of images that are stored in at least one of the memory and a storage device connected to the terminal device via the network, the plurality of images being in association with predetermined user identification information;
creating a first display image as the selected display image based on the stored operation log information in the memory when the advertisement information includes the image selection information and the image selection information relating to the game application corresponds to one of the plurality of images;

creating a second display image as the display image based on the advertisement information when the advertisement information does not include the image selection information;

causing the communication interface to receive image data from the server when the advertisement information includes the image selection information and the image selection information relating to the game application does not correspond to any of the plurality of images;

creating a third display image as the display image based on the received image data from the server when the advertisement information includes the image selection information and the image selection information relating to the game application does not correspond to any of the plurality of images; and displaying the advertisement including either the first display image, the second display image, or the third display image as the display image on the display, wherein the first display image corresponds to reproduction of the displayed scene of the game that was displayed on the display when the game application was executed in the past.

* * * * *